(12) United States Patent
Schunk et al.

(10) Patent No.: US 7,352,099 B2
(45) Date of Patent: Apr. 1, 2008

(54) ELECTRIC MACHINE

(75) Inventors: Holger Schunk, Lendershausen (DE); Albrecht Storath, Niederlauer (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/984,185

(22) Filed: Nov. 9, 2004

(65) Prior Publication Data

US 2005/0099086 A1  May 12, 2005

(30) Foreign Application Priority Data

Nov. 12, 2003   (DE)   ................................. 103 52 814

(51) Int. Cl.
*H02K 1/14*  (2006.01)
*H02K 1/16*  (2006.01)

(52) U.S. Cl. ....................................................... 310/216

(58) Field of Classification Search ................ 310/216, 310/254, 186, 185, 193
See application file for complete search history.

(56) References Cited

U.S. PATENT DOCUMENTS 5,051,634 A * 9/1991 Overton ........................ 310/64

6,335,582 B1 * 1/2002 Abukawa et al. ........... 310/214
2004/0095035 A1 * 5/2004 Sogabe et al. .............. 310/216
2005/0212374 A1 * 9/2005 Mitcham .................... 310/216

FOREIGN PATENT DOCUMENTS

| DE | 40 41 935 A1 | 7/1992 |
|---|---|---|
| DE | 101 12 268 A1 | 10/2002 |
| GB | 981 961 A | 2/1965 |
| JP | 2000341888 A | 12/2000 |

* cited by examiner

*Primary Examiner*—Tran Nguyen
(74) *Attorney, Agent, or Firm*—Henry M. Feiereisen; Ursula B. Day

(57) ABSTRACT

An electric machine includes a stator having slots of substantially rectangular cross section. The slots are subdivided into pairs of slots, with each pair of slots configured with parallel flanks, wherein teeth are formed between the slots and have alternating rectangular and triangular cross sections. Positioned on the teeth of rectangular cross section are tooth coils.

12 Claims, 5 Drawing Sheets

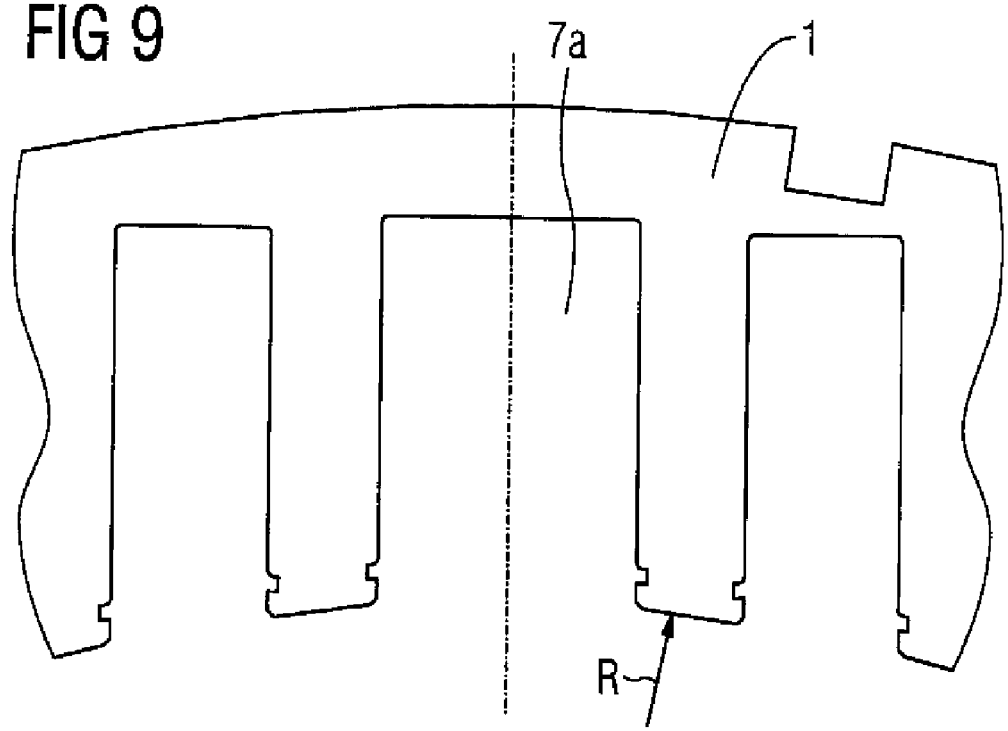

ELECTRIC MACHINE

CROSS-REFERENCES TO RELATED APPLICATIONS

This application claims the priority of German Patent Application, Serial No. 103 52 814.8, filed Nov. 12, 2003, pursuant to 35 U.S.C. 119(a)-(d).

BACKGROUND OF THE INVENTION

The present invention relates, in general, to an electric machine, and more particularly to an electric machine having a stator with slots for positioning tooth coils.

Nothing in the following discussion of the state of the art is to be construed as an admission of prior art.

Coils of electric machines are positioned in slots, i.e. the coils are prefabricated and then positioned in the slots of the electric machine. Machines are also known having pronounced windings to form tooth coils, whereby each winding surrounds a single tooth. These prefabricated tooth coils are positioned from outside into a star-shaped coil bobbin constructed in the form of a stacked metal sheets and pushed into a stator yoke. It is also possible to fabricate the windings of electric machines in the form of prefabricated coils which are then fed-in wire by wire into the slots of the stator. This is time-consuming and labor intensive.

Common to all these approaches is also the very complicated manufacture. In addition, these approaches lead to large end windings, and the slot filling factor is relatively low. Especially when a two-part lamination piece is involved, the provision of webs between the stator teeth is required to ensure a mechanical stability of the star-shaped packet. As a consequence, part of the flux which could assist the torque formation is shorted and thus becomes ineffective.

It would therefore be desirable and advantageous to provide an improved electric machine to obviate prior art shortcomings and to allow easy placement of a winding in the slots.

SUMMARY OF THE INVENTION

According to one aspect of the present invention, an electric machine includes a stator having slots of substantially rectangular cross section, wherein the slots are subdivided into pairs of slots, with each pair of slots configured with parallel flanks, wherein teeth are formed between the slots and have alternating rectangular and triangular cross sections, and tooth coils positioned on the teeth of rectangular cross section.

As a result of the configuration of the electric machine according to the present invention, the tooth coils can be directly placed onto the teeth that have rectangular cross section, without requiring winding each wire individually and without requiring an axial split of the lamination piece of the stator. The tooth coils can be prefabricated and secured in the slot by a simple casting process and/or provision of slot wedges. The tooth coil is hereby wound around a coil bobbin or forms a separate structure without coil bobbin.

According to another feature of the present invention, the teeth terminate in tooth heads in the direction of the air gap, which tooth heads are configured to maintain the boundary surface of the air gap equidistant on the side of the stator in the area of the teeth. This is especially of importance when several, e.g. three or four, slots are configured in neighboring relationship with parallel flanks, whereby, in particular when an uneven number of slots with parallel flanks are involved, coil halves of different tooth coils are provided in a slot.

By positioning the slots at a small angle, e.g. less than 5 degrees, relative to one another, the casting process results in a wedging effect for the tooth coils in the slots to permanently retain the tooth coils in the slots.

As a result of the greater slot filling degree, the electric power and torque parameters are improved in comparison to conventional electric machines. Moreover, manufacturing times of the electric machines are decreased.

According to another aspect of the present invention, a method of making a stator includes the steps of stamping lamination pieces to form slots separated by teeth, and packaging the lamination pieces to provide a lamination stack, positioning tooth coils about a first plurality of teeth that have a rectangular cross section, and casting the tooth coils with the lamination stack.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 9 is a schematic illustration of still another embodiment of a lamination piece according to the present invention.

DETAILED DESCRIPTION OF PREFERRED EMBODIMENTS

Figure 1:
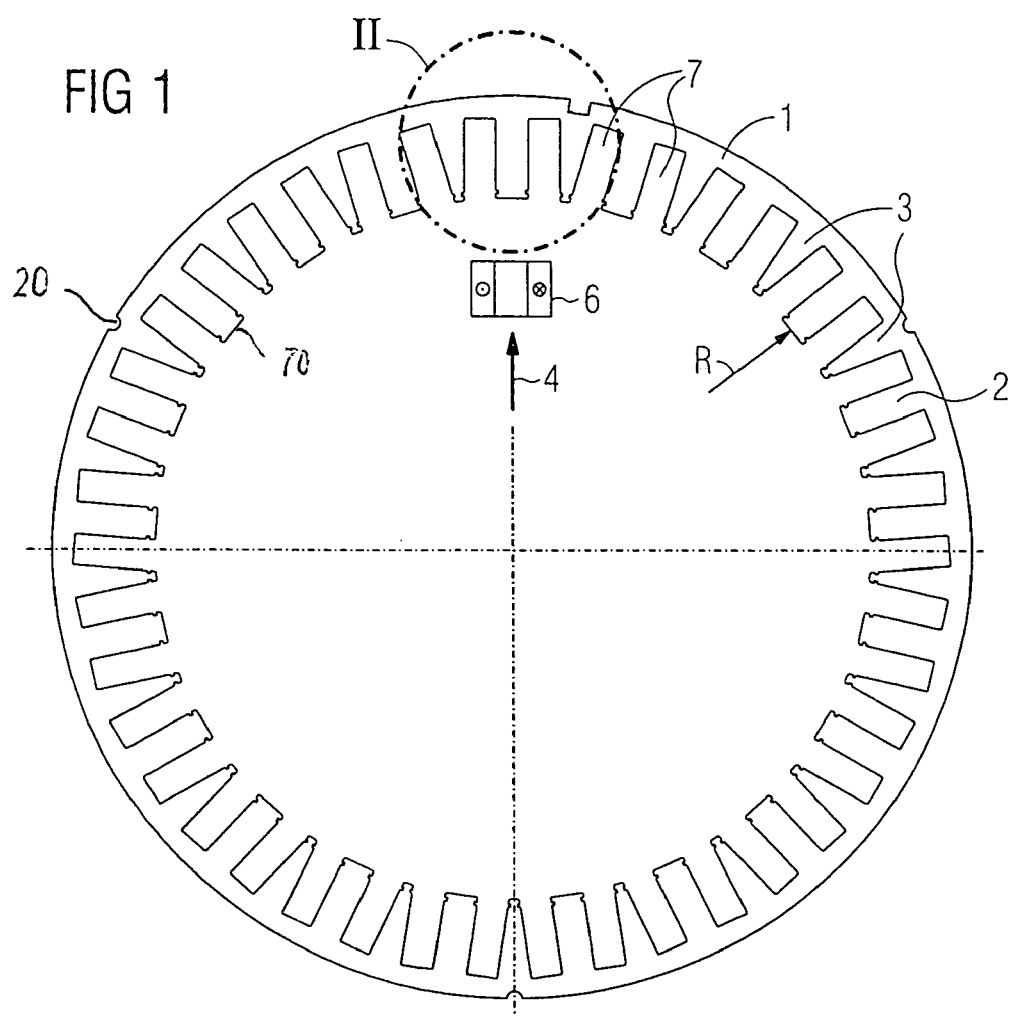
FIG. 1 is a schematic illustration of a lamination piece according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 3:
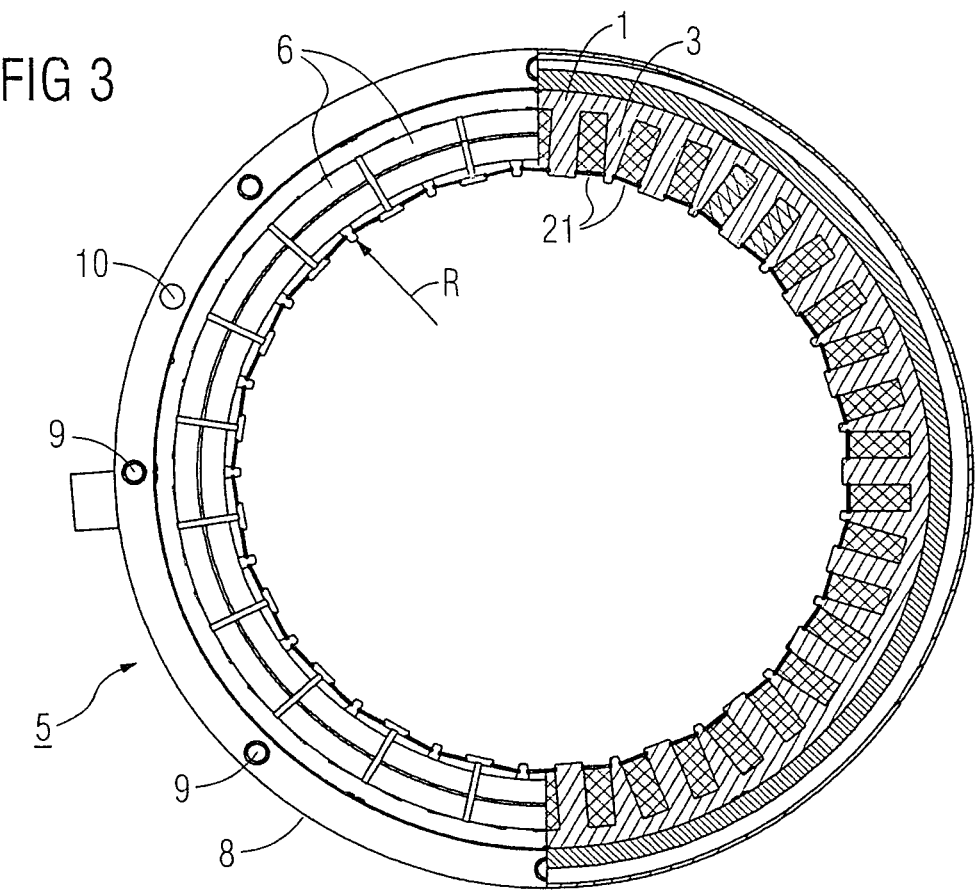
FIG. 3 is a partly sectional side view of a stator having incorporated the subject matter of the present invention.

Turning now to the drawing, and in particular to FIG. 1, there is shown a schematic illustration of a lamination piece 1 according to the present invention which together with like lamination pieces forms a lamination stack of a stator 5 (FIG. 3). Each lamination piece 1 has blanked or stamped therein a plurality of slots 7 to define teeth 2, 3 about the circumference, such that teeth 2 of generally rectangular cross section alternate with teeth 3 of generally triangular cross section. The lamination piece 1 is subdivided into adjacent pairs of two slots 7, whereby the two slots 7 have parallel flanks. As shown by way of example, during manufacture, each of the generally rectangular teeth 2 of the lamination stack of lamination pieces 1 is used here for placement of a tooth coil 6 which is attached to the respective tooth 2 in substantially radial direction as indicated by arrow 4. In other words, each of the two slots 7 contains half of a tooth coil 6.

Figure 2:
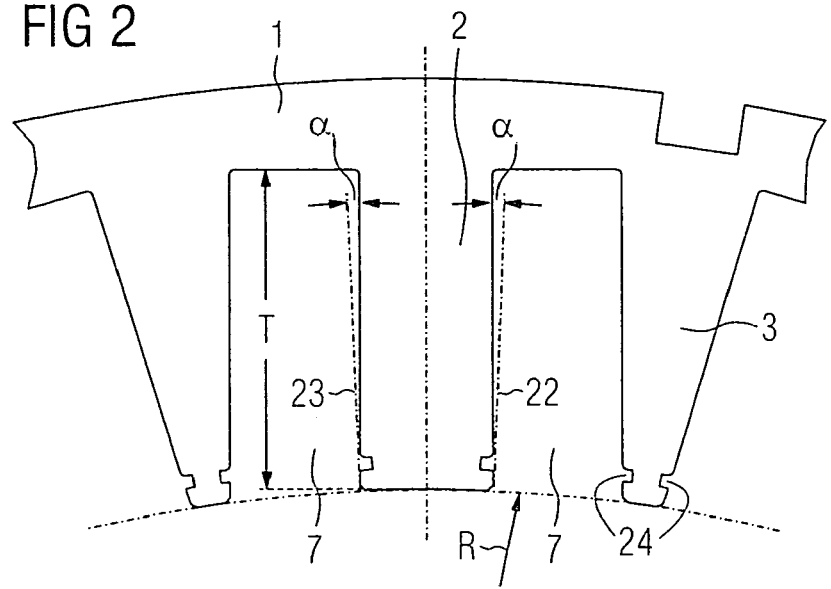
FIG. 2 is an enlarged detailed view of an encircled area of the lamination piece, marked by Roman number 11 in FIG. 1.

FIG. 2 shows an enlarged detailed view of the area encircled 11 in FIG. 1 to depict more clearly the parallel flanks of the two slots 7 which bound the generally rectangular tooth 2. Located adjacent to each of the slots 7 on the flank distal to the tooth 2 are two generally triangular teeth 3 which have no winding. Thus, a generally rectangular tooth 2 is followed by a generally triangular tooth 3.

As indicated by dash-dot lines in FIG. 2, the slots 7 may also be configured such that the tooth 2, bounded by the two slots 7, has a generally trapezoidal configuration, with the flanks 22 and 23 of the tooth 2 defining an angle α.

When packaging the lamination pieces 1 to a lamination stack, the tooth coils 6 are attached to the rectangular or trapezoidal teeth 2, and the assembly of lamination stack and tooth coils 6 is then embedded in a casting compound so that the tooth coils 6 are wedged in the slots 7. Suitably, the slots 7 and thus the teeth 2, 3 are configured during the stamping process such that their tooth heads 70 are shaped to provide for a circumferentially continuous air gap at an enveloping radius R. Of course, the slots 7 may have a slot depth or may be generally constructed with geometric dimensions during the stamping operation as to best suit the application at hand.

Figure 6:
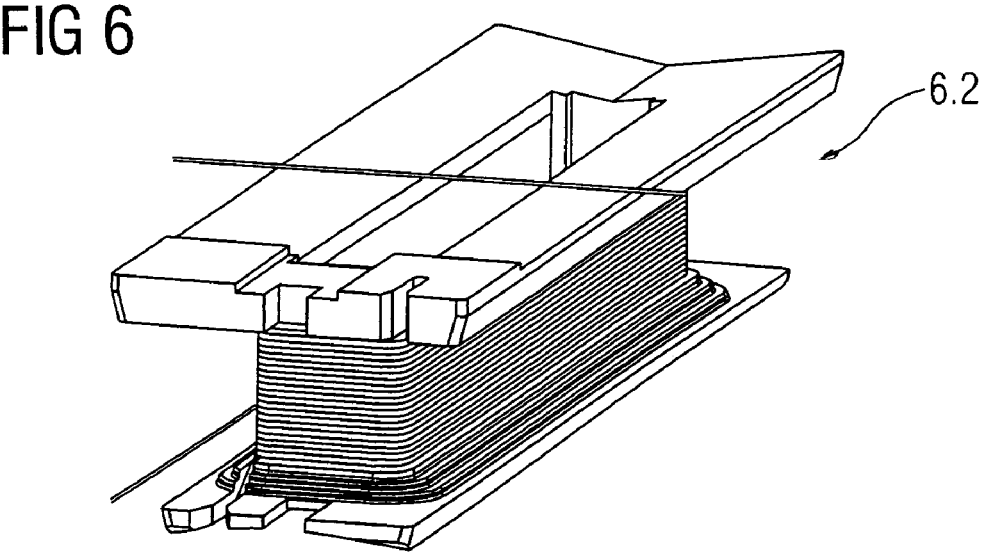
FIG. 6 is a perspective illustration of a coil bobbin without phase separator.
Figure 7:
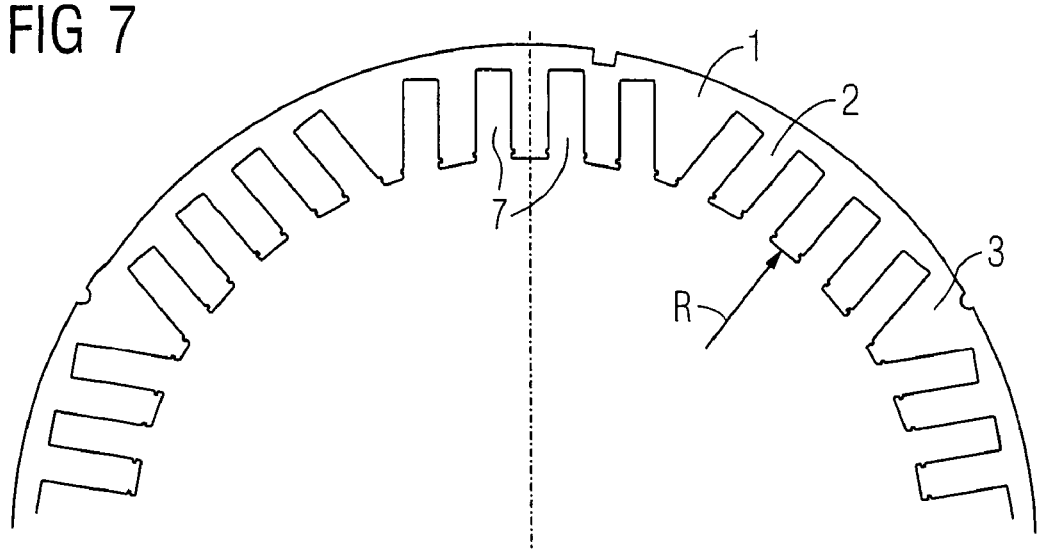
FIG. 7 is a schematic illustration of another embodiment of a lamination piece according to the present invention.
Figure 8:
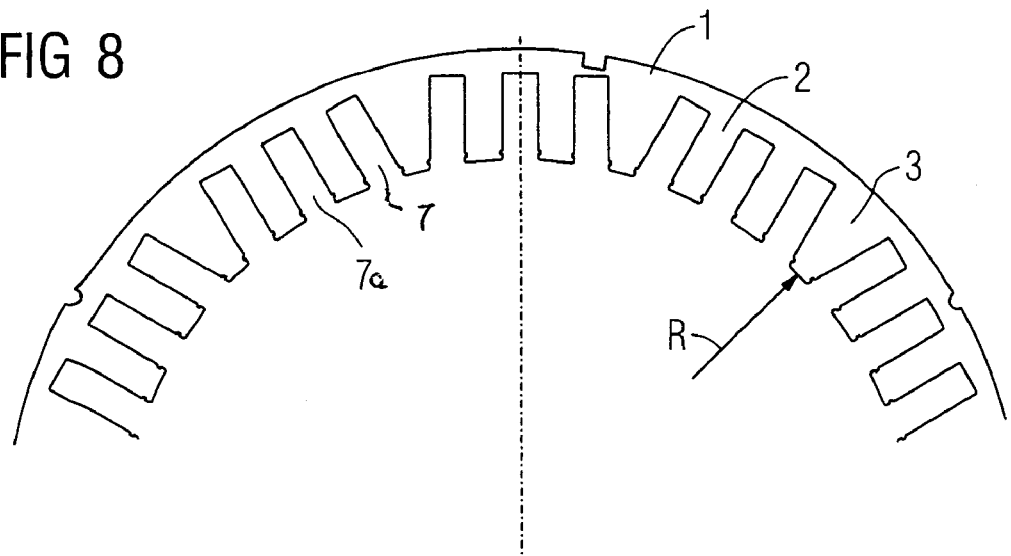
FIG. 8 is a schematic illustration of still another embodiment of a lamination piece according to the present invention.

As shown in FIGS. 7 and 8, each lamination piece 1 may also be subdivided in sections of more than two slots with parallel flanks. FIG. 8 shows for example sections with three immediately adjacent slots 7, whereby the center slot, designated here by reference numeral 7a and situated between outer slots 7, contains a coil half of two different tooth coils 6. Optionally, a phase separator 20, as shown by way of example in FIG. 6, may be provided in order to separate the adjacent coil halves. Suitably, the center slot 7a is sized wider than the other slots 7, as shown by way of example in FIG. 9. FIG. 7 shows the arrangement of sections with four slots 7 which generally follows the concept of the configuration shown in FIG. 1. In other words, each of the slots 7 contains half of a tooth coil 6 only.

Figure 4:
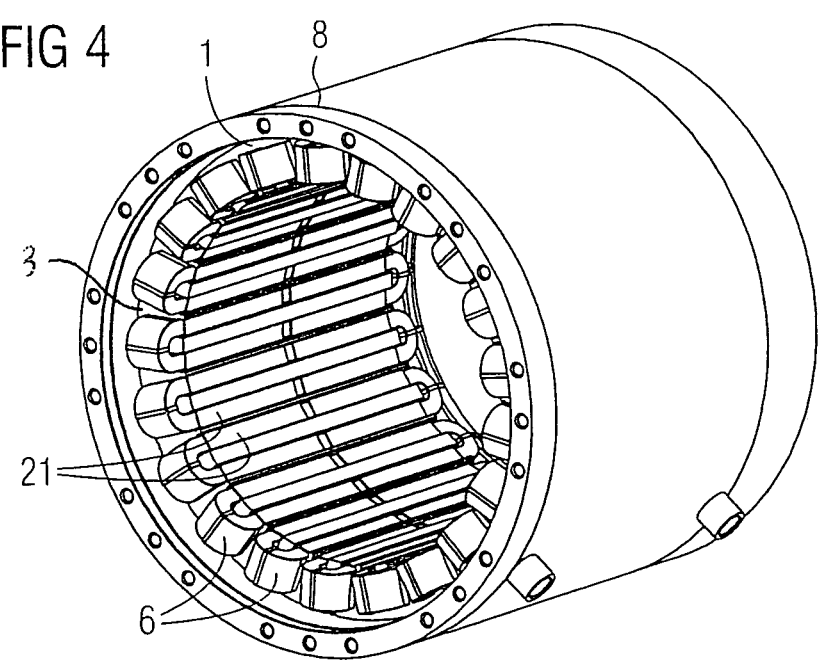
FIG. 4 is a perspective illustration of the stator of FIG. 3.

Turning now to FIGS. 3 and 4, there are shown an application of the lamination piece 1 of FIG. 1 for manufacturing a stator 5 which is depicted here on the right-hand half by way of a sectional view. As shown on the left-hand half of FIG. 3, the lamination stack is provided with the tooth coils 6 which are attached to the teeth 2 only. The teeth 3 have no windings and merely bear upon the tooth coils 6 (see also FIG. 4). The right-hand side of FIG. 3 shows the position of the tooth coils 6 in the slots 7. The slots 7 are suitably sealed by slot wedges 21 which are anchored in complementary recesses 24 (FIG. 2) of the teeth 2, 3. The entire lamination stack with embedded tooth coils 6 through the casting process is fitted in a housing 8 which includes fastening means 9 for attachment to a work machine and may also include cooling channels 10. The laminate section 1 may also have cutouts 20 at the radially outer edge of the laminate section 1 for engagement by the housing 8.

Figure 5:
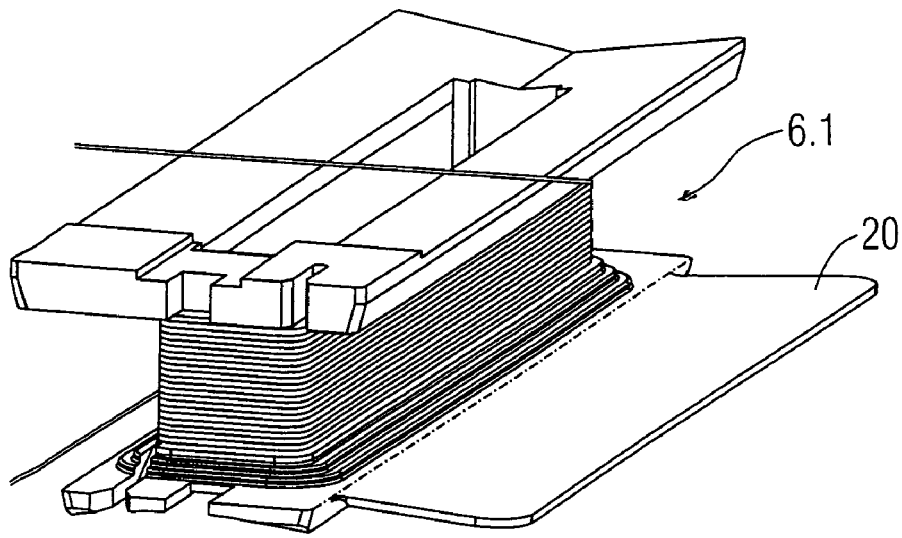
FIG. 5 is a perspective illustration of a coil bobbin with phase separator for placement into slots of the stator.

As shown in FIGS. 5 and 6, the tooth coils 6 may also be placed on coil bobbins 6.1 or 6.2 which can be secured to the tooth 2 through material union, form-fitting engagement or friction engagement. The coil bobbin 6.1 is here formed with the phase separator 20 to separate adjacent halves of two tooth coils 6 in a same slot, such as center slot 7a.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
    a stator having slots of substantially rectangular cross section, wherein the slots are subdivided into pairs of slots, with each slot of each pair of slots configured with parallel flanks, wherein teeth are formed between the slots and have alternating rectangular and triangular cross sections; and
    tooth coils placed about the teeth of rectangular cross section.

2. The electric machine of claim 1, wherein the teeth terminate in tooth heads in a radial direction towards an air gap, which tooth heads are configured to maintain a boundary surface of the air gap equidistant in the area of the teeth.

3. The electric machine of claim 1, wherein the teeth of rectangular and triangular cross sections have a radial dimension to define a circular boundary surface.

4. An electric machine, comprising a lamination stack comprised of a plurality of lamination pieces, each lamination piece having circumferential slots in spaced-apart relationship of generally tetragonal cross section, wherein the slots are subdivided into sections of slots, with each section of slots defining at least one tooth therebetween and being separated from an adjacent section of slots by a tooth of generally triangular cross section, wherein the at least one tooth of each section of slots has attached thereto a tooth coil, wherein each of the slots of each section has parallel flanks.

5. The electric machine of claim 4, wherein each section of slots has three slots to define two outer slots and a center slot, with two teeth being formed on opposite sides of the center slot for attachment of two of said tooth coil, said center slot being configured of a width which is greater than a width of each of the outer slots for accommodation of a half of each of the tooth coils.

6. The electric machine of claim 4, wherein each section of slots has four slots for defining three teeth for attachment of two of said tooth coil.

7. The electric machine of claim 4, wherein the slots are formed in the lamination piece such that the teeth of the section of slots define inwardly in radial direction a boundary surface of an air gap.

8. The electric machine of claim 4, wherein each tooth has a circumferential recess for receiving a slot wedge.

9. An electric machine, comprising:
    a stator having a plurality of slots, wherein the slots are subdivided into pairs of slots, with teeth being formed between the slots and having alternating rectangular and triangular cross sections, wherein the teeth of rectangular and triangular cross sections have a radial dimension to define a circular boundary surface for an air gap; and tooth coils placed about the teeth of rectangular cross section.

10. The electric machine of claim 9, wherein the slots have a generally rectangular configuration so that the slots of each pair of slots have parallel flanks.

11. The electric machine of claim 9, wherein the slots of each pair of slots have a generally trapezoidal configuration.

12. The electric machine of claim 11, wherein the trapezoidal slots have flanks extending at an angle in relation to a vertical.

* * * * *